(12) United States Patent
Yamada

(10) Patent No.: US 6,219,175 B1
(45) Date of Patent: Apr. 17, 2001

(54) UNIDIRECTIONAL OPTICAL AMPLIFIER

(75) Inventor: Minoru Yamada, Kanazawa (JP)

(73) Assignee: Kanazawa University, Ishikawa Pref. (JP)

( * ) Notice: Subject to any disclaimer, the term of this patent is extended or adjusted under 35 U.S.C. 154(b) by 0 days.

(21) Appl. No.: 09/046,508

(22) Filed: Mar. 24, 1998

(30) Foreign Application Priority Data

Mar. 25, 1997 (JP) .................................................. 9-071147

(51) Int. Cl.[7] .............................. H01S 3/09; H01S 3/30
(52) U.S. Cl. ............................. 359/335; 359/333; 372/2; 372/74
(58) Field of Search ................................. 359/330, 332, 359/333, 335; 331/94.1; 372/2, 74

(56) References Cited

U.S. PATENT DOCUMENTS

| | | | |
|---|---|---|---|
| 3,822,410 | * 7/1974 | Madey | 331/94 |
| 4,122,372 | 10/1978 | Walsh . | |
| 4,506,229 | * 3/1985 | Prosnitz et al. | 330/4 |
| 4,511,850 | * 4/1985 | Schlitt et al. | 330/4 |
| 4,529,942 | * 7/1985 | Patel et al. | 330/4 |
| 4,755,764 | * 7/1988 | Rosenberg et al. | 330/4.3 |
| 5,268,693 | 12/1993 | Walsh . | |

FOREIGN PATENT DOCUMENTS

| | | |
|---|---|---|
| 867987 A2 | * 9/1998 | (EP) . |
| 911 925 A2 | * 4/1999 | (EP) . |
| 10-270808 | * 10/1998 | (JP) . |

OTHER PUBLICATIONS

M. Yamada, IEEE Journal of Quantum Electronics, vol. 35, #2, pp 147–152, Feb. 1999.*

Kasai et al, IEEE Trans. Plasma Science, vol. 20, #3, Jun. 1992.*

\* cited by examiner

*Primary Examiner*—Nelson Moskowitz
(74) *Attorney, Agent, or Firm*—Venable; Robert J. Frank; Jeffrey W. Gluck

(57) ABSTRACT

A unidirectional optical amplifier comprising an optical dielectric waveguide having a high refraction index for leading light from a light input terminal to a light output terminal and a straight electron beam transit section extended in an electron beam transit direction. The optical amplifier includes an amplifier section for amplifying light in one direction by utilizing an energy level sufficiently higher than a Fermi level, and an emissive section for emitting an electron beam in the electron beam transit section. The electron beam transit section is preferably constituted so that the effective mass of an electron in the amplifier section becomes small, and the optical dielectric waveguide and the electron beam transit section are arranged in such a manner that the wave number of light in the amplifier section becomes large and an electric field component of the light is generated in the electron beam transit direction.

17 Claims, 9 Drawing Sheets

FIG_1

FIG_6a
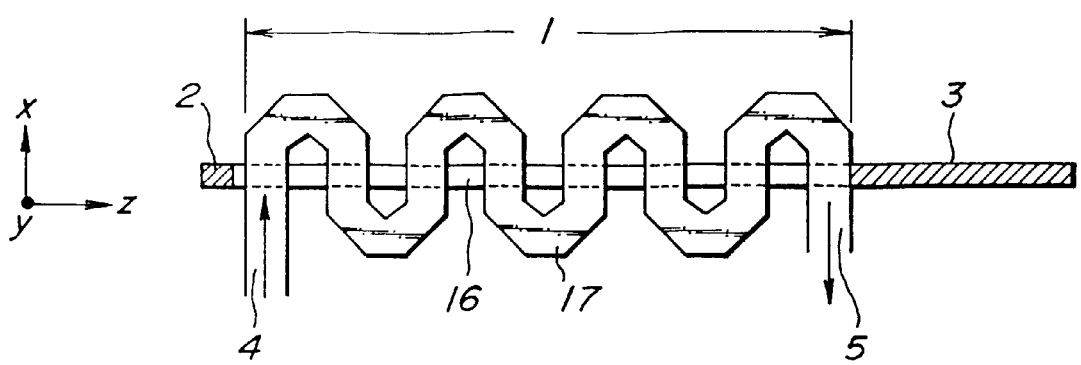
FIG_6b
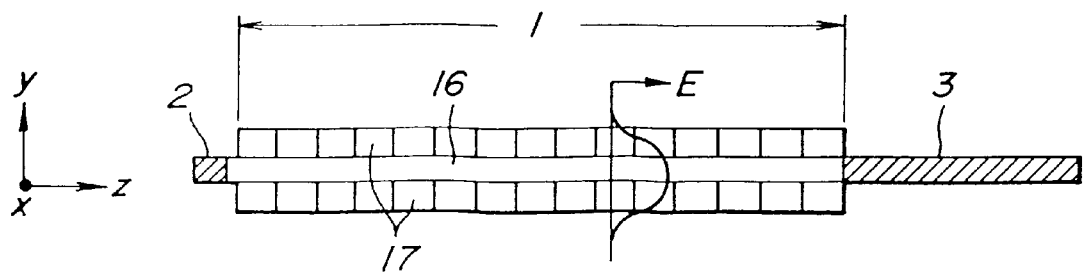

FIG_7a
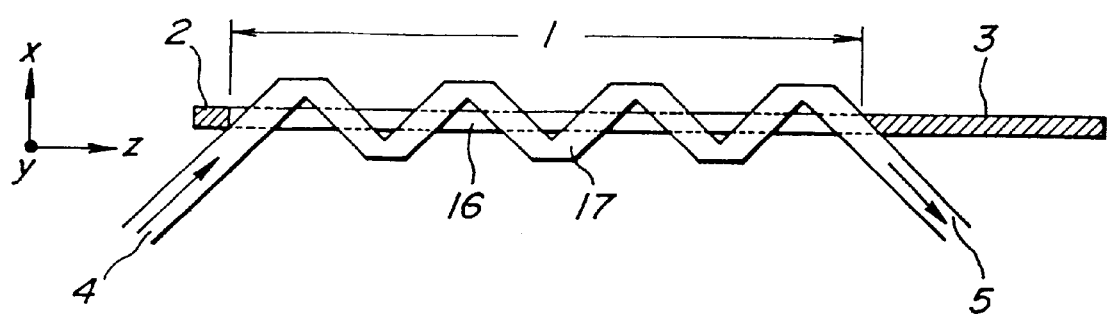
FIG_7b
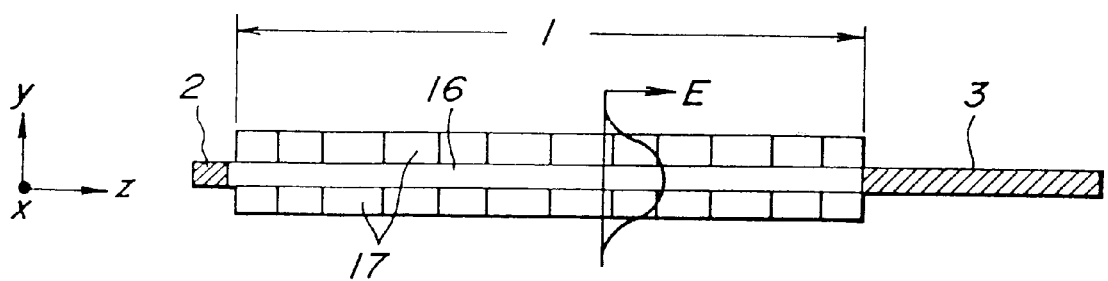

FIG_8a
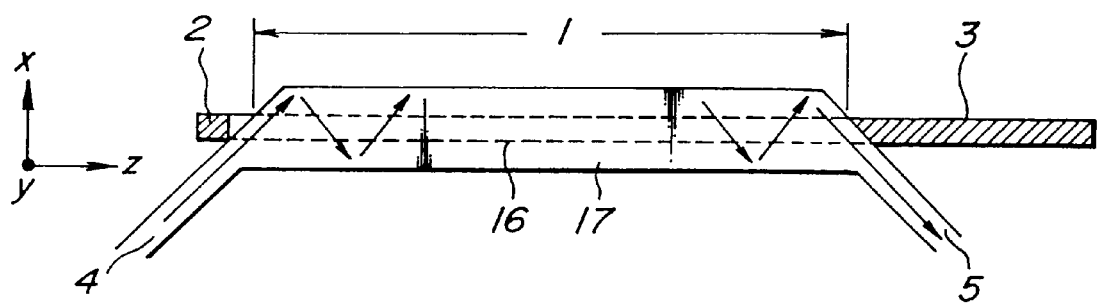
FIG_8b
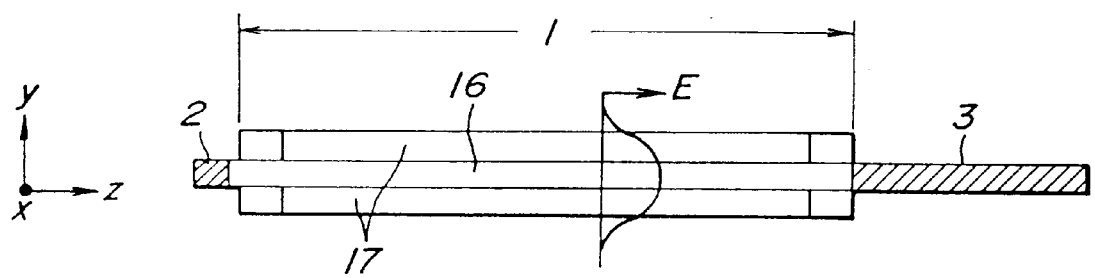

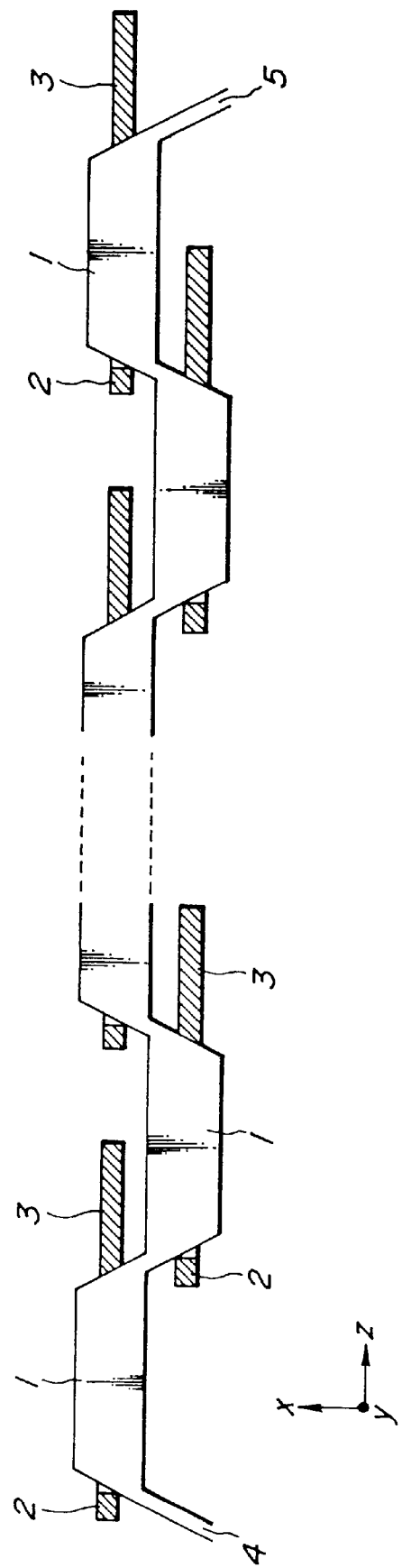

UNIDIRECTIONAL OPTICAL AMPLIFIER

BACKGROUND OF THE INVENTION

1. Field of the Invention

The present invention relates to a unidirectional optical amplifier capable of application to many fields, such as electrical engineering, electronic engineering, information engineering and opto-electronics, which amplifies light only in one direction.

2. Prior Art

Prior art methods for effecting optical amplifying include a laser, a traveling-wave tube, and a propagating wave amplification of light due to an interband electron transition.

The laser is a typical opto-electronics element or opto-electronics device for generating light and for amplifying light. The direction of light to be amplified is possibly reversed, and both forward and backward waves may be amplified. Accordingly, when the emitted light is reflected at the surface of a lens, optical fiber, optical disk or the like, and is incident on the laser as return light, this return light has also been amplified. Therefore, the oscillating characteristic and the amplifying characteristic of a laser are deteriorated, and excess noise is generated.

As countermeasures to the above malfunction suggested at present, the typical method is a technique that reentering of return light is generally prevented by providing at an output side of a laser an isolator for passing light only in a single, desired direction. It is, however, only possible to make optical isolators of magnetic material with bulk shape as the main material, and the price thereof is high, so the utility thereof may be limited. On this account, the optical isolator is utilized for fundamental study in the optical field and in optical fiber communication systems of large capacity, but applications requiring small size and low price, the optical disk technology, can not utilize the optical isolator, and thus characteristic deterioration and noise generation due to the return light becomes a technical obstacle in utilizing a laser.

Also, there is a system for performing high-speed information processing by light by integrating the light generating section, amplifier section, modulating section or the like, which utilizes a laser, with each other as an optical integrated circuit. However, in this system, the light returns from a forward section to a backward section, so that a problem emerges that a composition as an optical circuit having a composite function cannot be completed.

Moreover, the traveling-wave tube is a unidirectional electron tube having the highest operable frequency over the upper limit of operable frequency of a usual electron tube having unidirectional electronic functionality or a transistor (about 1000 MHz). This traveling-wave tube makes an electromagnetic wave propagate by using a delayed transmission line made of metal. An electron beam emitted from an electron gun gives energy to this electromagnetic wave and the electromagnetic wave is amplified when the speed of the electron beam and the propagation speed of the electromagnetic wave are coincident with each other. Other electromagnetic wave components traveling in the reverse direction are not amplified. However, the higher the frequency, the shorter the wavelength, so that the upper limit of usable frequency of a traveling-wave tube is determined by manufacturing techniques for the metal of the transmission path. As a result, the traveling-wave tube can not be utilized with frequencies in the range of dozens of GHz or more (wavelengths of several cm or less). Accordingly, fabrication of a traveling-wave tube capable of applying light having a wavelength of less than 1 $\mu$m exceeds the limitations of current manufacturing techniques, and is impossible at this time.

Moreover, in the prior art of traveling wave amplification of light by interband electron transition, there have been attempts at unidirectional amplification of light using a semiconductor laser performing generation and amplification of light by electron transitions from conduction band to valence band in a semiconductor and by taking a value of momentum of light, $h\beta/2\pi$ (where, h is Plank's constant, and $\beta$ is wave number of light) that may be ignored in most cases because its value is usually small. In this case, since scattering of an electron is extremely large, clear unidirectional amplifying action has not been confirmed.

SUMMARY OF THE INVENTION

The present invention has as its object to provide a unidirectional optical amplifier capable of performing optical amplifying that is not influenced by the return light.

To this end, according to a first aspect of the present invention, there is provided a unidirectional optical amplifier comprising an optical dielectric waveguide having a high refraction index for leading light from a light input terminal to a light output terminal and a straight electron beam transit section extended in the direction of electron beam transit, and including an amplifier section for amplifying light in one direction by utilizing an energy level sufficiently higher than a Fermi level, an emissive section for emitting an electron beam into the electron beam transit section, and an electron absorption section for absorbing the electron beam emitted from the electron beam transit section, characterized by the electron beam transit section being comprised so that the effective mass of an electron in the amplifier section becomes small, and by the optical dielectric waveguide and the electron beam transit section being arranged in such a manner that a wave number of light in the amplifier section is increased and the electric field component of light is generated in the electron beam transit direction.

In an embodiment of the present invention, the electron beam transit section of the amplifier section for amplifying light in one direction by utilizing an energy level sufficiently higher than a Fermi level is constituted by a material of a high refractive index so as to make the effective mass of an electron small, and the optical dielectric waveguide of the amplifier section is constituted in such a manner that a wave number of light in said amplifier section is made large and the electric field component of light is generated in the direction of electron beam transit. Accordingly, some of the light will, as a result, seep into the electron beam transit section. In a typical embodiment, the path of the propagated light will intersect the electron beam transit section in plural locations.

According to this embodiment of the present invention, the effective mass of an electron in the amplifier section is made small, and a wave number of light is made large (in other words, a propagation speed of light in the direction of electron beam transit is made small), so that the unidirectional optical amplifier for realizing optical amplification that is not influenced by the return light can be provided. The degree to which these phenomena occur is highly dependent upon the shape and the high refractive index of the optical dielectric waveguide.

Also in this embodiment of the invention, amplification occurs by way of the aforementioned seepage of light into the electron beam transit section. In this manner, the seeped light receives energy from the electron beam by intersecting with it, the electron beam having been radiated from the electron radiating section and having decreased effective electron mass within the electron beam transit section.

In a preferred embodiment of the present invention, the amplifier section is so constructed that the optical dielectric waveguide is wound on and around the electron beam transit section in a spiral shape.

According to a preferred embodiment of the present invention, the optical dielectric waveguide for constituting the amplifying section is wound on and around the electron beam transit section in a spiral shape at its periphery.

According to a preferred embodiment of the present invention, the optical dielectric waveguide is wound on and around the electron beam transit section. A wave number of light in the amplifier section is made large by means of this constitution and by means of a high refraction index of the optical dielectric waveguide, and the electric field component of light can be generated in the electron beam transit direction.

In a preferred embodiment of the present invention, the amplifier section is so constructed that the optical dielectric waveguide and the electron beam transit section intersect each other orthogonally at plural locations.

According to a preferred embodiment of the present invention, the optical dielectric waveguide and the electron beam transit section which constitute the amplifier section intersect each other orthogonally at plural portions thereof.

According to a preferred embodiment of the present invention, the optical dielectric waveguide and the electron beam transit section intersect each other orthogonally at plural portions thereof, so that a wave number of light in the amplifier section is made large by this constitution and by a high refraction index of the optical dielectric waveguide, and the electric field component of light is generated in the electron beam transit direction.

In a preferred embodiment of the present invention, the amplifier section is so constructed that the optical dielectric waveguide and the electron beam transit section intersect each other with the same set angle at plural portions.

According to a preferred embodiment of the present invention, the optical dielectric waveguide and the electron beam transit section which constitute the amplifier section intersect each other with the same set angle at plural portions.

According to a preferred embodiment of the present invention, the optical dielectric waveguide and the electron beam transit section intersect each other with the same set angle at plural portions, so that a wave number of light in the amplifier section is made large by this constitution and by a high refraction index of the optical dielectric waveguide, and the electric field component of light is generated in the electron beam transit direction.

In a preferred embodiment of the present invention, the amplifier section is so constructed that the optical dielectric waveguide is arranged in parallel to the electron beam transit section so as to extend the electron beam transit section through a center portion of the optical dielectric waveguide.

According to a preferred embodiment of the present invention, the optical dielectric waveguide is arranged in parallel to the electron beam transit section so that the electron beam (transit section) travels through a center portion of the optical dielectric waveguide.

According to a preferred embodiment of the present invention, the optical dielectric waveguide is arranged in parallel to the electron beam transit section in such a manner that the electron beam transit section is extended through a center portion of the optical dielectric waveguide, so that a wave number of light in the amplifier section is made large by a high refraction index of the optical dielectric waveguide, and the electric field component of light is generated in the electron beam transit direction.

In a preferred embodiment of the present invention, the electron beam transit section is constituted from a II-VI group compound semiconductor, such as ZnSe, ZnTe, ZnO, ZnS, CdSe, CdTe, CdS and mixed crystals thereof, or from an insulating material such as $CaF_2$, $SrF_2$, $BaF_2$, in the case of using it for the visible-light region to the near-infrared region, and from a III-V group compound semiconductor, such as InP, InSb, InAs, GaP, GaSb, GaAs and mixed crystals thereof, in the case of using it for the infrared region.

According to a preferred embodiment of the present invention, the electron beam transit section is constituted from a II-VI group compound semiconductor such as ZnSe, ZnTe, ZnO, ZnS, CdSe, CdTe, CdS and mixed crystals thereof, or from an insulating materials such as $CaF_2$, $SrF_2$, $BaF_2$ in the case of using it for the visible-light region to the near-infrared region, and from a III-V group compound semiconductor, such as InP, InSb, InAs, GaP, GaSb, GaAs and mixed crystals thereof, in the case of using it for infrared region.

According to a preferred embodiment of the present invention, the electron beam transit section is constituted by any one of the above materials, and even in the case of using light of the visible-light region to the near-infrared region and light of the infrared region, the effective mass of an electron in the amplifier section is made small.

In a preferred embodiment of the present invention, the optical dielectric waveguide is constituted from a II-VI group compound semiconductor, such as ZnSe, ZnTe, ZnO, ZnS, CdSe, CdTe, CdS and mixed crystals thereof, or from a III-V group compound semiconductor, such as GaN, GaP, AlAs and mixed crystals thereof, in the case of using it for the visible light region to the near infrared region, and from III-V group compound semiconductors, such as InP, InSb, InAs, GaP, GaSb, GaAs and mixed crystals thereof, or from a IV group semiconductor of Si, Ge or the like, in the case of using it for the infrared region.

According to a preferred embodiment of the present invention, the optical dielectric waveguide is constituted from a II-VI group compound semiconductor, such as ZnSe, ZnTe, ZnO, ZnS, CdSe, CdTe, CdS and mixed crystals thereof, or from a III-V group compound semiconductor, such as GaN, GaP, Al As and mixed crystals thereof, in the case of using it for the visible-light region to the near infrared region, and from III-V group compound semiconductors, such as InP, InSb, InAs, GaP, GaSb, GaAs and mixed crystals thereof, or from a IV group semiconductor of Si, Ge or the like, in the case of using it for the infrared region.

According to a preferred embodiment of the present invention, the optical dielectric waveguide is constituted by any one of the above materials, even in the case of using light of the visible-light region to the near-infrared region and light of the infrared region, a wave number of light in the amplifier section is made large.

In a preferred embodiment of the present invention, a unidirectional optical amplifier comprises a multi-stage construction arranged by connecting in cascade several unidirectional optical amplifiers of the types discussed above.

According to a preferred embodiment of the present invention, the unidirectional optical amplifier of multi-stage construction is constructed by connecting in cascade several unidirectional optical amplifiers of the types discussed above.

According to a preferred embodiment of the present invention, the unidirectional optical amplifier of multi-stage construction is constructed by connecting in cascade several unidirectional optical amplifiers of the types discussed above so that a desired degree of amplification can be achieved.

BRIEF DESCRIPTION DF THE DRAWING

FIG. 6a is a cross sectional view showing another constitution of an amplifier section of the unidirectional optical amplifier of the first embodiment according to the present invention.

FIG. 6b is a cross-sectional view showing another constitution of an amplifier section of the unidirectional optical amplifier of the first embodiment according to the present invention.

FIG. 7a is a cross-sectional view showing a further constitution of an amplifier section of the unidirectional optical amplifier of the first embodiment according to the present invention.

FIG. 7b is a cross-sectional view showing a further constitution of an amplifier section of the unidirectional optical amplifier of the first embodiment according to the present invention.

FIG. 8a is a cross-sectional view showing a further constitution of an amplifier section of the unidirectional optical amplifier of the first embodiment according to the present invention.

FIG. 8b is a cross-sectional view showing a further constitution of an amplifier section of the unidirectional optical amplifier of the first embodiment according to the present invention.

FIG. 9 is an explanatory view showing a unidirectional optical amplifier of multi-level construction constituted by cascade-connecting a plurality of unidirectional optical amplifiers of the first embodiment according to the present invention.

DESCRIPTION OF PREFERRED EMBODIMENT

Figure 1:
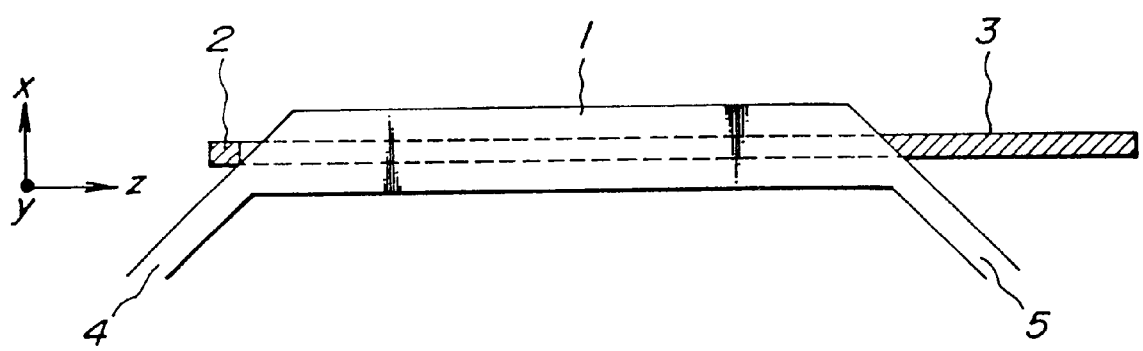
FIG. 1 is a principal view showing a basic structure of a unidirectional optical amplifier of the first embodiment of the present invention.

Hereinafter, an embodiment of the present invention is explained in detail with reference to the drawings. FIG. 1 shows a principal view showing a basic structure of the unidirectional optical amplifier of the first embodiment of present invention. As shown in FIG. 1, a unidirectional optical amplifier of this embodiment comprises an amplifier section 1, an electron emitting section 2 coupled to a left edge portion of the amplifier section 1, an electron absorption section 3 coupled to a right end portion of the amplifier section 1 so as to make it in coaxial relation in the electron beam transit direction (in z axis direction shown in FIG. 1), and a light input terminal 4 is formed at the left and lower end portion of the amplifier section 1, and a light output terminal 5 is formed at the right and lower end portion of the amplifier section 1.

Figure 2:
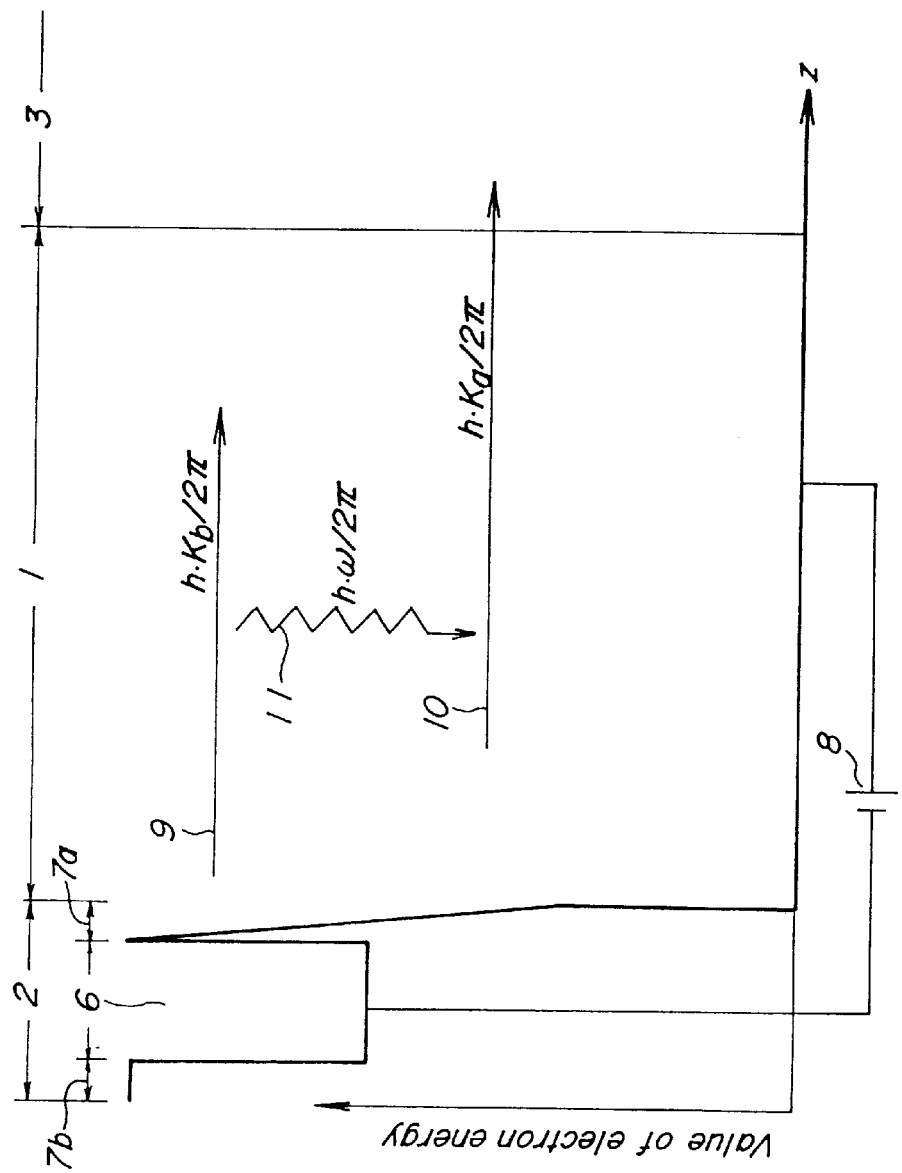
FIG. 2 is an explanatory view explaining operation of a constitution of the whole unidirectional optical amplifier of the first embodiment according to the present invention.
Figure 3:
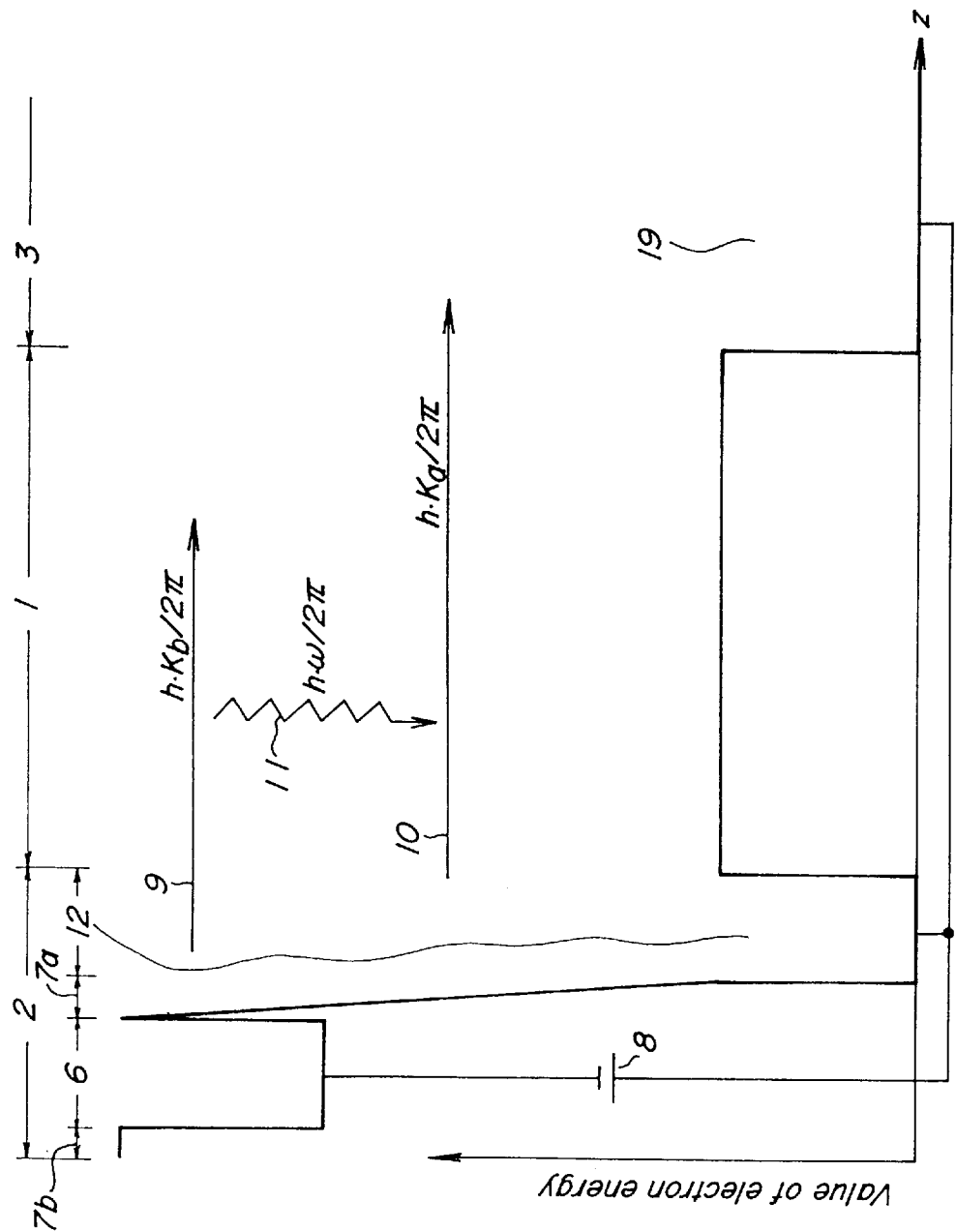
FIG. 3 is an explanatory view explaining operation of another constitution of the whole unidirectional optical amplifier of the first embodiment according to the present invention.
Figure 4:
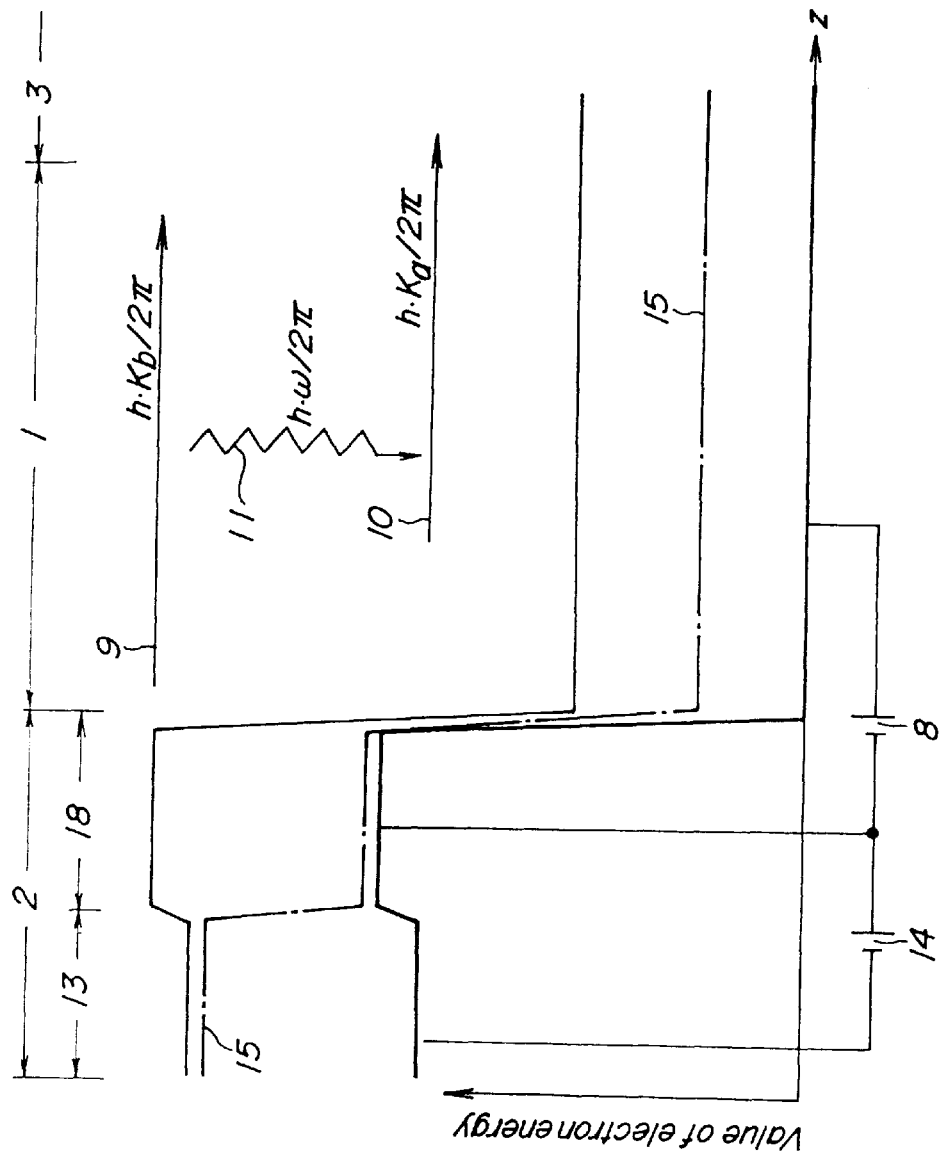
FIG. 4 is an explanatory view explaining operation of a further constitution of the whole unidirectional optical amplifier of the first embodiment according to the present invention.

FIG. 2 to FIG. 4 show explanatory views explaining operation of constitution of the whole unidirectional optical amplifier of the first embodiment, in which the abscissa shows the z-axis of FIG. 1, and the ordinate shows an electronic energy value.

In the constitution shown in FIG. 2, the electron emitting section 2 comprises a potential barrier 7b, an emitting electrode 6, and a potential barrier 7a in succession in the z-axis direction. The emitting electrode 6 of this electron emitting section 2 consists of a metal or alloy comprising Au, Ag, Al, $CoSi_2$ or the like, and potential barriers 7a, 7b consist of an insulating material of $SiO_2$, $AlO_3$, or $CaF_2$. The amplifier section 1 and the electron absorption section 3 are constituted by a semiconductor material discussed below.

In FIG. 2, when negative voltage 8 is applied to the electron emitting section 2 from the amplifier section 1, a potential of electron emitting section 2 is increased so that a potential barrier 7a becomes thin. Accordingly, an electron beam 9 of energy $W_b$ and momentum $hK_b/2\pi$ (where h is Planck's constant) is emitted in the direction from electron emitting section 2 to amplifier section 1 by the tunnel effect. An electron of this electron beam imparts energy to light 11 of wave number 13 with an angular frequency co so as to satisfy relations (1) and (2) below, and then is damped and becomes an electron beam 10 of energy $W_a$ and momentum $hK_a/2\pi$.

$$W_b - W_a = h\omega/2\pi \quad (1)$$

$$K_b - K_a = \beta \quad (2)$$

This damped electron beam 10 is absorbed at the electron absorption section 3.

In the constitution shown in FIG. 3, the electron emitting section 2 comprises the potential barrier 7b, the emitting electrode 6, the potential barrier 7a and a potential holding electrode 12 arranged successively in the z-axis direction. The electron absorption section 3 consists of metal, and forms an electronic absorption electrode 19. The potential holding electrode 12 is arranged to apply to the negative voltage 8 between the emitting electrode 6 and the amplifier section 1.

This electron emitting section 2 and the potential holding electrode 12 of the emitting electrode 6 of this and the electron absorption section 3 consist of a metal or alloy comprising Au, Ag, Al, $CoSi_2$ or the like, and the potential barriers 7a, 7b consist of an insulating material of $SiO_2$, $AlO_3$, or $CaF_2$. also, the amplifier section 1 consists of an insulating material discussed below and semiconductor materials.

In the constitution shown in FIG. 3, the principle of electronic emissive action from the electron emitting section 2 and the optical amplifying in amplifier section 1 is the same as that of the embodiment shown in FIG. 2. In the constitution shown in FIG. 3, however, the point where the damped electron beam 10 is absorbed with an electronic absorption electrode 19 of the electron absorption section 3, and returned to the electronic maintenance electrode 12, is different from that of the embodiment shown in FIG. 2.

In the constitution shown in FIG. 4, the electron emitting section 2 is constituted by arranging a semiconductor junction consisting of an n-type semiconductor 13 and a p-type semiconductor 18 in the z-axis direction, and the amplifier section 1 and the electron absorption section 3 consist of an i-type semiconductor. In this constitution, a negative voltage 8 is applied to the p-type semiconductor 18 from the amplifier section 1, and then, a negative voltage 14 is applied to the n-type semiconductor 13 from the p-type semiconductor 18. In FIG. 4, a dash-and-dot line 15 shows a distribution state of Fermi level. An electron is injected into the p-type semiconductor 18 from the n-type semiconductor 13 and is emitted to the amplifier section 1 as an electron beam 9. Electron beam 9 is then damped after imparting energy to amplify it, the light 11 just as in FIG. 2, and it is finally absorbed with electron absorption section 3 as an electron beam 10.

Optical amplifying action at the above amplifier section 1 is analyzed theoretically by applying the density matrix method, an analysis technique of quantum mechanics, to the model shown in FIGS. 2–4, and thus a gain constant g of the light may be expressed by the following equation.

$$g \approx \xi \sqrt{\frac{\mu_0}{\varepsilon_0}} \frac{\varepsilon^2 \lambda c \langle N_b \rangle}{\pi n_{eff}^3 \Delta W} \quad (3)$$

where $\xi$ is the ratio of the part that intersects the electron beam in whole distributions of light, $\mu_0$ is a permeability in a vacuum, $\epsilon_0$ is a dielectric constant in a vacuum, e is a charge of an electron, $\lambda$ is a wavelength of light, c is the speed of light in a vacuum, <Nb> is an energy spread width of an electron beam, and an $n_{eff}$ is an efficiency of refraction index.

Also, given that effective mass of an electron at the amplifier section 1 is m and a charge of an electron is—e, the voltage 8 necessary for the amplification may be expressed by the following equation.

$$V_e \approx \frac{m}{2e}\left(\frac{c}{n_{eff}}\right)^2 \quad (4)$$

Moreover, a length L of the amplifier section 1 is limited by the energy relaxation time $\tau$ of an electron and may be expressed by the following equation.

$$L \leq \tau c/n_{eff} \quad (5)$$

Therefore, amplification factor A of the amplifier may be expressed by the following equation.

$$A = \exp(gL) \quad (6)$$

In order to realize optical amplifying while satisfying the above equations (1), (2), it is necessary to make effective mass m of an electron in the amplifier section small, and wave number of light $\beta = n_{eff}\omega/c$ is made large by a high refractive index of the optical dielectric waveguide and constitution of the amplifier section 1; that is, it is necessary to make the propagation speed of light in the z direction (being an electronic transit direction) equal to $c/n_{eff}$. (When effective mass m of an electron becomes large, the equations (1), (2) can not be satisfied so long as equivalent refraction index $n_{eff}$ is not made large, so that length L of the amplifier section 1 in the equation (5) becomes short, and thus the amplification factor in the equation (6) becomes small). Moreover, it is necessary to cause the electric field component of light to be in the z direction, so that if the electric field component of light is not so generated, the light is not amplified. The light in the reverse direction is not amplified, since a wave number of light becomes—$\beta$ and does not satisfy the equation (2). Hereinafter, an embodiment in which the speed of light is decreased and the electric field component in the z direction is obtained, is explained with reference to FIGS. 5 to 8.

Figure 5:
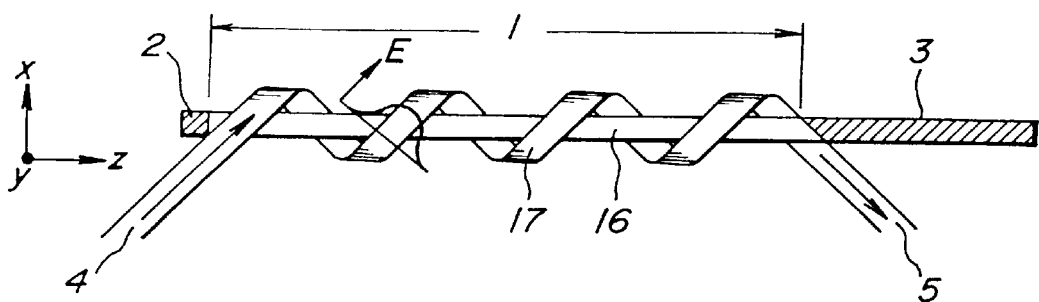
FIG. 5 is a cross-sectional view showing a constitution of an amplifier section of the unidirectional optical amplifier of the first embodiment according to the present invention.

In the constitution shown in FIG. 5, the amplifier section 1 is constituted by arranging or winding an optical dielectric waveguide 17 of high refraction index around the electron beam transit section 16 in a spiral shape. Generally, the optical dielectric waveguide serves to such that the electric field E of light is distributed so as to converge the light on the center of the waveguide, as shown in FIG. 5. However, the light is not completely confined to the waveguide path so that some light seeps outside of waveguide path 17, into electron beam transit section 16. The seepage into electron beam transit section 16 is attributable to the fact that the electric field component E of the light includes a component in the direction of electron beam transit. Furthermore, the wave number of the light decreases to an extent dependent upon the use of materials having high refractive index in and upon the shape of optical dielectric waveguide 17; accordingly, the velocity of propagation of light in the direction of electron beam transit decreases to a speed at which energy can be absorbed from the electron beam. Therefore, in this embodiment, as shown in FIG. 5, the electric field E of light is distributed with seepage from optical dielectric waveguide 17, and intersects with the electron beam at a slant, so that the electric field component in the z direction amplifies the electric field E of light.

In the constitution shown in FIGS. 6(a) and 6(b), the amplifier section 1, as shown in FIG. 6(a), is constituted in such a manner that the optical dielectric waveguide 17 of high refraction index and the electron beam transit section 16 intersect orthogonally with each other at several portions. as shown in FIG. 6(b), a cross-sectional view in the y direction, the electron beam transit section 16 is arranged such that it is sandwiched by optical dielectric waveguide 17. In this embodiment, the light is propagated in the optical dielectric waveguide 17 in a zigzag manner, so that the propagation speed of light in the z direction decreases, and thus an electric field component in the z direction is generated as shown. As in the embodiment of FIG. 5, part of the light seeps from the optical dielectric waveguide 17 to the electron beam transit section 16. Moreover, by making electron beam transit section 16 thin enough compared with the wavelength of the light, a distribution of the electric field E of the light becomes strong at the electron beam transit section 16, as shown in the schematic diagram of FIG. 6(b), and thus can be amplified.

In the constitution shown in FIGS. 7(a) and 7(b), the amplifier section 1 is constituted in such a manner that the optical dielectric waveguide 17 has a zigzag section, as shown in FIG. 7(a), and thus the optical dielectric waveguide 17 and the electron beam transit section 16 intersect at several portions with the same set angle. The optimum intersection angle between the optical dielectric waveguide 17 and the electron beam transit section 16 extending in the z direction is determined based on refraction index and width of the optical dielectric waveguide 17, width of the electron beam transit section 16, and magnitude of the applying voltage 8 (discussed in connection with FIGS. 1–4). In this embodiment, the folded portion of the optical dielectric waveguide 17 was decreased in comparison with the above embodiment shown in FIGS. 6(a) and 6(b). As a result, unnecessary light reflection and scattering loss at the folded portion are decreased.

In the constitution shown in FIGS. 8(a), and 8(b), the amplifier section 1 is constituted in such a manner that the optical dielectric waveguide 17 is constructed with a width wider than the electron beam transit section 16, as shown in FIG. 8(a); As shown in FIG. 8(b), the optical dielectric waveguide 17 is arranged in parallel to the electron beam transit section 16 such that electron beam transit section 16 extends through the center portion of the optical dielectric waveguide 17. In this case, the light meanders through optical dielectric waveguide 17 by reflecting off the sides of optical dielectric waveguide 17 (the trace thereof is shown in FIG. 8(a) by an arrow).

In the above respective constitutions, materials used for the electron beam transit section 16 must satisfy the following three conditions.

(1) Effective mass of an electron must be small.
(2) Energy of a parabolic function shape must extend to an upper level portion of the conduction band.
(3) Loss of light must be minimal.

In light of these conditions, it is preferable that in the case of providing for the region from the near-infrared region to the visible light region, that the electron beam transit section comprise a II-VI group compound semiconductor, such as ZnSe, ZnTe, ZnO, ZnS, CdSe, CdTe, CdS and mixed crystals thereof or an insulating material such as $CaF_2$, $SrF_2$, $BaF_2$ is utilized, and in case of using the infrared region, a III-V group semiconductor, such as InP, InSb, InAs, GaP, GaSb, GaAs and mixed crystals thereof, is utilized. The above materials are also utilized as a material of the electron absorption section 3.

In constructing the optical dielectric waveguide 17, loseless materials having a high refraction index must be utilized. It is preferable that in the case of providing for the region from the near-infrared region to the visible-light region, the optical dielectric waveguide be comprised of a II-VI group compound semiconductor, such as ZnSe, ZnTe, ZnO, ZnS, CdSe, CdTe, CdS and mixed crystals thereof or of a III-V group compound semiconductor such as GaN, GaP, AlAs and mixed crystal thereof. In the case of providing for the infrared region, a III-V group compound semiconductors such as InP, InSb, InAs, GaP, GaSb, GaAs and mixed crystals thereof, or a IV group semiconductor of Si, Ge or the like, is utilized.

The feature having the greatest influence on performance of the optical amplifier in the embodiments of FIGS. 5–8 is what materials comprise the electron beam transit section 16. In order to obtain a large amplification factor, materials must be selected such that energy of a parabolic function shape extends to an upper level portion of a conduction band. However, a certain amplification factor may be obtained with only a one-stage optical amplifier because the existing materials do not completely meet these demands.

In order to obtain a large amplification factor, as shown in FIG. 9, plural optical amplifiers, according to the above embodiments, are connected in cascade to form a unidirectional optical amplifier of multi-stage configuration. In this case, as a constitution of the amplifier section 1, the electron emitting section 2, and the electron absorption section 3, it is assumed that any one of FIGS. 2 to 4, and any one of FIGS. 5 to 8 may be combined.

In the unidirectional optical amplifier of multistage construction of FIG. 9, if the light is inputted from the light input terminal 4 of the left side, this light is outputted from the light output terminal 5 of the right side. Whole amplification factor A in the case of cascade connecting N optical amplifiers (N is a natural number) is expressed by following equation.

$$A = \exp(NgL) \tag{7}$$

An operation of this embodiment is explained hereinafter.

When a negative voltage 8 (cf. FIGS. 2 to 4) is applied between the amplifier section 1 of the unidirectional optical amplifier and the electron emitting section 2 shown in FIG. 1, and the light is directed into the light input terminal 4, the amplified light can be obtained from the light output terminal 5. In this case, coherent light and incoherent light can be amplified. Also, a certain material is selected from the above described materials, and any one of FIGS. 2 to 4 and any one of FIGS. 5 to 8 are combined to form the amplifier section 1, the electron emitting section 2 and the electron absorption section 3, so that unidirectional amplification of light can be realized at various wavelengths. In this case, also, the wavelength of light to be amplified is determined by the band gap of materials of the electron beam transit sections and the energy level structure in the conduction band.

The unidirectional optical amplifier in this embodiment realizing the above unidirectional amplification of the light is different from the conventional technique in the following points.

Firstly, this embodiment shows an element or a device for amplifying light only in one direction and is essentially different from "a laser" which is a conventional technique for performing a reversible amplification in both directions.

Secondly, optical amplifying operation in this embodiment is a phenomenon foreseen by new theoretical analysis by the present inventor. By this theoretical analysis, the present inventor suggests a theory different from the conventional technique and other designs fundamentally.

Thirdly, the amplifier section 1 of this embodiment uses an electron in a solid body and serves to amplify the light in one direction by utilizing an energy level excited sufficiently higher than Fermi level at thermal equilibrium, and thus, is greatly different from "the traveling-wave tube" in that this conventional technique utilizes an electron in a vacuum.

Moreover, it is fundamentally different that the "progress wave amplification of light by the interband transition," being a conventional technique tried in fundamental research, uses an electron of a Fermi level neighborhood, and is the interband transition from conduction band to valence band.

Fourthly, the present embodiment performs the unidirectional amplification of light by utilizing an energy level excited sufficiently higher than the Fermi level, so that interference by phase scattering of the electron is minimized, and thus light amplification is possible. This phenomenon is greatly different from the above "progress wave amplification of light by the interband transition" in that such amplification was not realized because of an obstacle due to phase scattering of an electron. Moreover, currently, realization of functional elements utilizing all kinds of "electronic wave interference" is being examined scientifically, but these functional elements are extremely prone to interference due to electronic phase scattering, so that interaction between electron and electromagnetic field is generated only within a range in which the electronic phase scattering does not occur. In contrast, a unidirectional amplifier of light according to this embodiment is different from these functional elements and has a characteristic determined by energy relaxation time, so that the range in which the interaction occurs between electron and electromagnetic field can be extended.

Fifthly, this embodiment utilizes a dielectric transmission path for transmission of light (electromagnetic wave), and thus it is greatly different from the N, "traveling-wave tube", which requires electromagnetic wave propagation by a metal transmission path, and it also differs in that "electromagnetic wave is amplified by an electric current induced in the metal transmission path" is proved theoretically. In this embodiment, even if there is not a metal transmission path, the fact that light is directly amplified by an electron beam, is proved theoretically based on quantum mechanics, so that a metal transmission path is not required, principally.

As is explained above, according to the present embodiment, unidirectional optical amplification which is not realized by prior-art systems, can be realized. The unidirectional optical amplifier according to the present embodiment corresponds to be, so to say, equivalent to a transistor in the optical frequency domain. Hence, the provision of such a unidirectional optical amplifier, in addition to being a continuous advance of current telecommunications techniques, optical metering techniques, and optical memory techniques, represents a significant advance in the fields of optical electronics, electronics electrical engineering, and information electrical engineering.

For example, when a unidirectional optical amplifier according to the present invention is applied to a light source for optical fiber communication and is applied to various light measuring apparatus, even if an optical isolator is not used, the detrimental effect of the reflected return light does not occur. Moreover, when the unidirectional optical amplifier according to the present invention is applied to an optical pick-up in an optical disk, influence of the reflected return light disappears, and it can maintain an optical signal of high quality. Also, if the amplifying conditions are changed properly, an optical modulator and an optical switch may be formed, thus permitting application to numerous optical functional elements.

The greatest advantage in realizing such a unidirectional optical amplifying is that circuit composition using optical signals can be possible, so that optical functional elements of every kind, such as optical oscillators, optical amplifiers, optical modulators, optical switches, and optical memories can be constituted integrally as an optical integrated circuit. In the past, attempts have been made to realize optical integrated circuits; however, these attempts have failed, mainly because of the light return from a downstream optical functional element to an upstream optical stage, which prevented the realization of separation of functions. This problem is solved by inserting unidirectional optical amplifiers of this embodiment, and function separation among optical elements becomes possible.

Furthermore, by realization of an optical integrated circuit, genuine light information processing and optical operations to treat information of larger volumes than possible with electronic circuits become possible, and realization of a genuine optical computer having a processing speed that is 10000 times or more than existing electronic computers can be anticipated.

EXAMPLE

In the constitution shown in FIG. 1, the amplfier section 1, the electron emitting section 2, and the electron absorption section 3 are constituted as shown in FIGS. 2 and 6, the electron beam transit section 16 is formed with ZnSe, and the optical dielectric waveguide 17 is formed with GaAs. In this constitution, when theoretical analysis is performed, it was assumed that with applying voltage (8) Ve+2.5V for light of wavelength $\lambda=1$ $\mu$m, the gain constant g of light becomes $g \geqq 540$ cm$^{-1}$ for the element length L of the amplifier section 1. If L=2.3 $\mu$m, then the amplification factor A per one stage becomes 1.13 or more, which is obtained from equation (6), so that optical amplification of 1.13 times or more is realized.

Moreover, when a unidirectional optical amplifier of multi-stage construction shown in FIG. 9 was used by utilizing 20 unidirectional optical amplifiers shown in FIG. 1, the amplification factor A of 20 stages of unidirectional optical amplifiers becomes 11 or more, which is obtained from the equation (7). Hence, optical amplification of 11 times or more is realized.

What is claimed is:

1. A unidirectional optical amplifier comprising:
   an emissive section for emitting an electron beam;
   an amplifier section for amplifying light in one direction using an energy level greater than a Fermi level, comprising:
      an optical dielectric waveguide for leading light from a light input terminal to a light output terminal; and
      a straight electron beam transit section extended in an electron beam transit direction and receiving said electron beam, said electron beam transit section decreasing the effective mass of an electron passing through the electron beam transit section, said electron beam transit section and said optical dielectric waveguide being arranged such that a wave number of light input to said optical dielectric waveguide increases in the course of passing through the optical dielectric waveguide and an electric field component of said light is generated in the electron beam transit direction; and
   an electron absorption section for absorbing said electron beam emitted from the electron beam transit section after passing through it.

2. A unidirectional optical amplifier as claimed in claim 1, wherein the optical dielectric waveguide is wound on and around the electron beam transit section in a spiral.

3. A unidirectional optical amplifier as claimed in claim 1, wherein the optical dielectric waveguide and the electron beam transit section intersect each other orthogonally at plural portions.

4. A unidirectional optical amplifier as claimed in claim 1, wherein the optical dielectric waveguide and the electron beam transit section intersect each other at the same set angle at plural portions.

5. A unidirectional optical amplifier as claimed in claim 1, wherein the optical dielectric waveguide is arranged in parallel to the electron beam transit section such that the electron beam transit section extends through the center portion of the optical dielectric waveguide.

6. A unidirectional optical amplifier as claimed in claim 1, wherein the electron beam transit section is constituted from a II-VI group compound semiconductor or an insulating material for use in the range from the visible-light region to the near-infrared region, and from a III-V group compound semiconductor for use in the infrared region.

7. A unidirectional optical amplifier as claimed in claim 1, wherein the optical dielectric waveguide is constituted from a II-VI group compound semiconductor or a III-V group compound semiconductor for use in the range from the visible-light region to the near-infrared region, and from a III-V group compound semiconductor or a IV group semiconductor for use in the infrared region.

8. A unidirectional optical amplifier comprising a multi-stage construction arranged by connecting in cascade two or more unidirectional optical amplifiers as claimed in claim 1.

9. A unidirectional optical amplifier as claimed in claim 6, wherein said group II-VI compound semiconductor is selected from the group consisting of ZnSe, ZnTe, ZnO, ZnS, CdSe, CdTe, CdS, and mixed crystals thereof.

10. A unidirectional optical amplifier as claimed in claim 6, wherein said insulating material is selected from the group consisting of CaF$_2$, SrF$_2$, and BaF$_2$.

11. A unidirectional optical amplifier as claimed in claim 6, wherein said III-V group compound semiconductor is selected from the group consisting of InP, InSb, InAs, GaP, GaSb, GaAs, and mixed crystals thereof.

12. A unidirectional optical amplifier as claimed in claim 7, wherein said II-VI group compound semiconductor comprising said optical dielectric waveguide for use in the range from the visible light region to the near-infrared region is selected from the group consisting of ZnSe, ZnTe, ZnO, ZnS, CdSe, CdTe, CdS, and mixed crystals thereof.

13. A unidirectional optical amplifier as claimed in claim 7, wherein said III-V group compound semiconductor comprising said optical dielectric waveguide for use in the range from the visible light region to the near-infrared region is selected from the group consisting of GaN, GaP, AlAs, and mixed crystals thereof.

14. A unidirectional optical amplifier as claimed in claim 7, wherein said III-V group compound semiconductor comprising said optical dielectric waveguide for use in the infrared region is selected from the group consisting of InP, InSb, InAs, GaP, GaSb, GaAs, and mixed crystals thereof.

15. A unidirectional optical amplifier as claimed in claim 7, wherein said IV group semiconductor comprising said optical dielectric waveguide for use in the infrared region comprises one of Si or Ge.

16. A unidirectional optical amplifier as claimed in claim 6, wherein said II-VI group compound semiconductor is selected from the group consisting of ZnSe, ZnTe, ZnO, ZnS, CdSe, CdTe, CdS and mixed crystal thereof, or said insulating material is selected from the group consisting of $CaF_2$, $SrF_2$, $BaF_2$, and said III-V group compound semiconductor is selected from the group consisting of InP, InSb, InAs, GaP, GaSb, GaAs and mixed crystal thereof.

17. A unidirectional optical amplifier as claimed in claim 7, wherein said II-VI group compound semiconductor is selected from the group consisting of ZnSe, ZnTe, ZnO, ZnS, CdSe, CdTe, CdS and mixed crystal thereof, or said III-V group compound semiconductor is selected from the group consisting of GaN, GaP, AlAs and mixed crystal thereof, and said III-V group compound semiconductor is selected from the group consisting of InP, InSb, InAs, GaP, GaSb, GaAs and mixed crystal thereof, or said IV group semiconductor comprises one of Si or Ge.

* * * * *